Oct. 4, 1955   R. M. DENSMORE   2,719,766
ACTUATOR CYLINDER CONSTRUCTION
Filed Jan. 16, 1953
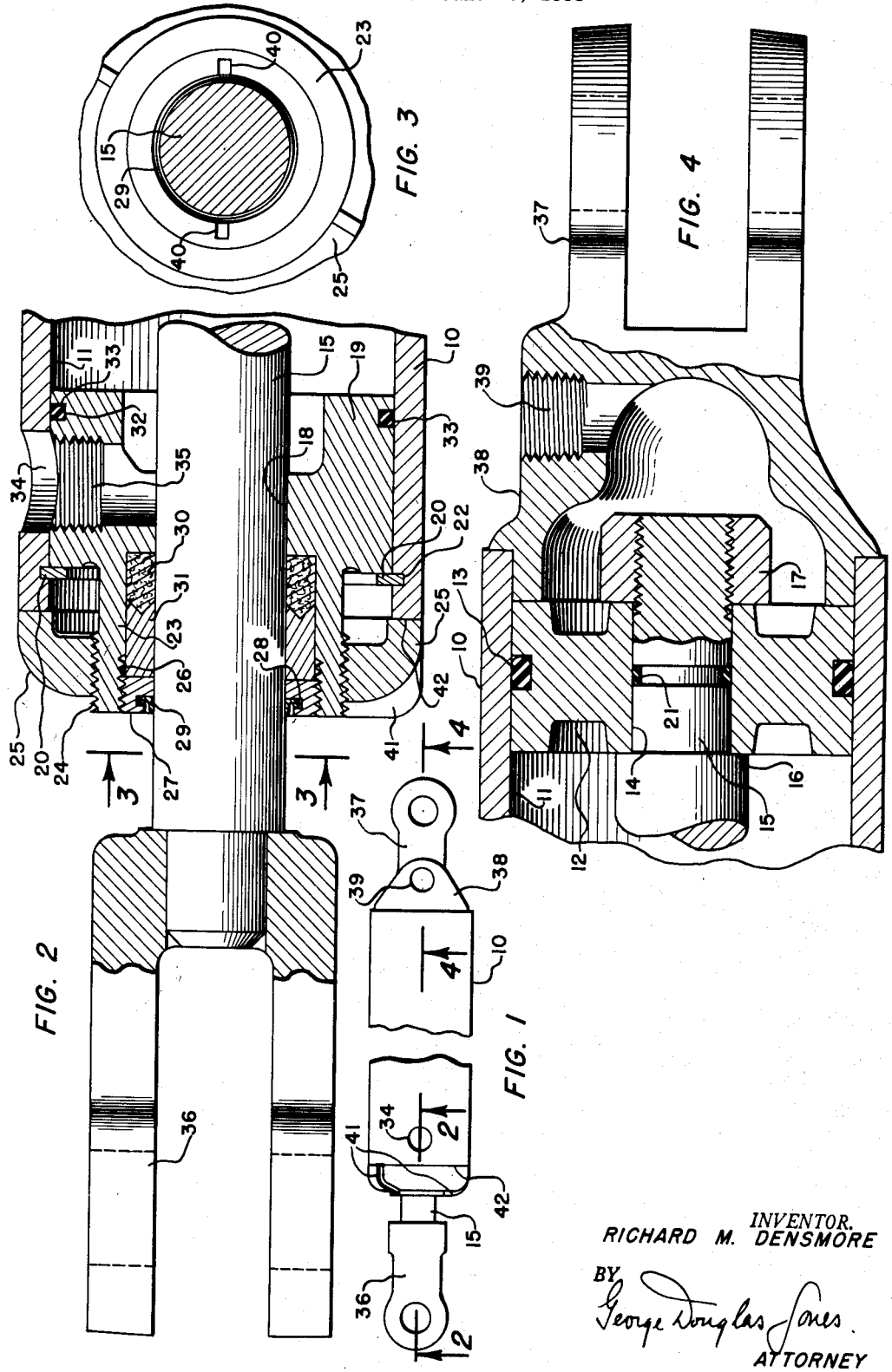
INVENTOR.
RICHARD M. DENSMORE
BY
George Douglas Jones
ATTORNEY

United States Patent Office 2,719,766
Patented Oct. 4, 1955

2,719,766

ACTUATOR CYLINDER CONSTRUCTION

Richard M. Densmore, South Gate, Calif.

Application January 16, 1953, Serial No. 331,713

8 Claims. (Cl. 309—2)

This invention relates to an actuator cylinder construction, and more particularly to a removable shaft guide and end structure for hydraulic or pneumatic cylinders.

In the operation and maintenance of such actuator cylinders, abrasions and external damage of seals present critical problems. For such reasons more frequent overhaul or replacement of actuator cylinders has heretofore been necessary.

The life of dust seals, and also hydraulic seals is dependent on mechanism which will maintain concentricity of such parts relative to the plunger shaft, and which will also protect them from accidental mechanical damage.

It is an object of this invention to provide an actuator cylinder construction wherein hydraulic and dust seals are protected from mechanical damage.

Another object is to provide a novel means for maintaining the end member in an actuating cylinder.

Another object is to provide an actuator cylinder construction which may be very easily and quickly taken apart without damaging or disturbing the hydraulic or dust seals thereof.

Another object of the invention is to provide an actuator cylinder end member which is removably fixed inside the cylinder.

Another object of the invention is to provide an actuator cylinder wherein an end member is retained by a snap ring which is prestressed against axial load by a screw threaded means holding the end member against the snap ring.

Another object of the invention is to provide an actuator cylinder construction wherein a readily removable end member provides a plunger shaft guide, and also precisely supports both hydraulic and dust seals by an integral concentric portion surrounding the plunger shaft.

Another object is to provide an actuator cylinder construction wherein an end member is retained against internal pressure in the bore of the cylinder by an abutment ring which greatly simplifies the construction and servicing of the cylinder and its operating parts.

A further object of the invention is to provide an actuator cylinder construction which is very durable under the most rigorous operating conditions.

Further objects and advantages will be apparent from the following specification and appended claims.

Reference is directed to the accompanying drawing in which:

Fig. 1 is a fragmentary side elevational view of the actuator cylinder construction.

Fig. 2 is an enlarged fragmentary sectional view taken from the line 2—2 of Fig. 1.

Fig. 3 is a transverse sectional taken from the line 3—3 of Fig. 2, and

Fig. 4 is an enlarged fragmentary sectional view taken from the line 4—4 of Fig. 1.

The cylinder 10 is provided with a bore 11 wherein the plunger 12 is reciprocally mounted. This plunger 12 is provided with an external O-ring seal 13. The bore 14 of the plunger 12 is provided with an internal O-ring seal 21 surrounding the shaft 15.

The plunger 12 is fixed to the shoulder 16 of the shaft 15 by means of the nut 17. The plunger shaft 15 extends through a concentric bore 18 in the end member 19. The end member 19 thus provides a guide for the shaft 15. The end member 19 is removably positioned in the bore 11 and is retained against axial movement by the snap ring 20 and the nut 25. The ring 20 is disposed internally of the cylinder 10 and is positioned in the annular groove 22. A portion of the ring 20 projects from the groove 22 forming an abutment for the end member 19. This end member 19 is provided with a projecting cylindrical portion 23 having external screw threads 24 screw threadably engaged by the nut 25. This nut 25 abuts the end of the cylinder 10 for holding the end member 19 securely abutted to the ring 20, prestressing the same against axial load. In the cylinder portion 23 are screw threads 26 engaged by conforming threads of the seal nut 27. This seal nut 27 is a ring-shaped nut surrounding the plunger shaft 15, and is provided with an internal groove 28. In the groove 28 is a dust seal 29 which wipes the shaft 15. Surrounding the shaft 15 inwardly of the nut 27 is the packing 30 engaged by the gland 31. The gland 31 is compressively forced against the packing 30 by the nut 27. This nut 27 is provided with spanner wrench notches 40 for use in screw threadably adjusting the same as shown in Fig. 3 of the drawing. In the peripheral surface of the end member 19 is the annular groove 32 which retains the seal 33.

The cylinder 10 is provided with an opening 34 axially aligned with the internally screw threaded opening 35 in the end member 19. The opening 35 communicates with the interior of the cylinder 10 at one end of the plunger 12. The outer end of the plunger shaft 15 is provided with a clevis portion 36 for use in connection with a part to be actuated.

The opposite end of the actuator cylinder is provided with an end cap 38 having an integral clevis 37. The end cap 38 is provided with an internally screw threaded conductor connection 39 which communicates with the interior of the cylinder 10.

In operation the nut 25 is engaged by lugs 41 thereon and is screw threadably adjusted on the thread 24 of the cylindrical portion 23 for tightening the end member 19 against the ring 20 and for securely abutting said nut 25 at the end 42 of the cylinder 10. It will be noted that this nut 25 is substantially flush with the outer diameter of the cylinder 10 and that it is provided with a contoured surface as shown best in Fig. 2 of the drawing. The form and disposition of the nut 25 protects the end of the honed cylinder bore 11. The extension of the end member 19 from the seal 33 to the ring 20 provides sufficient bearing in the bore 11 to maintain very accurate and concentric disposition of the seals and the shaft 15 relative to the bore axis. When the nut 25 is screw threadably removed from the portion 23 of the end member 19, the snap ring 20 may be compressively removed, and the end member 19 together with seals and the plunger 12 on the shaft 15 may be withdrawn from the cylinder 10.

Although a particular arrangement of an actuator cylinder construction has been disclosed, variations may be made therein without departing from the spirit of the invention as set forth in the appended claims.

Having thus described my invention what I claim is:

1. An actuator cylinder construction comprising, a tubular cylinder having a plunger bore therein, an end member in said bore, said cylinder provided with an internal groove therein adjacent said end member, a retainer in said groove providing an abutment for said end member, means engaging the end of said cylinder and screw threaded on said end member for holding the same against said retainer, said means having an external dimension substantially equal to that of said cylinder, said end member having a concentric bore therein and a plunger shaft extending therethrough.

2. An actuator cylinder construction comprising a tubular cylinder having a plunger bore therein, an end member in said bore, said cylinder provided with an internal groove therein adjacent said end member, a retainer in said groove providing an abutment for said end member, means directly engaging the end of said cylinder and screw threaded on said end member for holding the same against said retainer, said end member having a concentric bore therein and a plunger shaft extending therethrough, said end member having sealing means engaging the bore of said cylinder and said plunger shaft.

3. An actuator cylinder construction comprising a tubular cylinder having a plunger bore therein, an end member in said bore, said cylinder provided with an internal groove therein adjacent said member, a retainer in said groove providing an abutment for said end member, means engaging the end of said cylinder and screw threaded on said end member for holding the same against said retainer, said cylinder and said end member having a fluid passage extending from the outside of said cylinder to the inner end of said end member.

4. An actuator cylinder construction comprising a tubular cylinder having a plunger bore therein, an end member in said bore, said cylinder provided with an internal groove therein adjacent said end member, a retainer in said groove providing an abutment for said member, means engaging the end of said cylinder, said means having an external dimension substantially equal to that of said cylinder, said means screw threaded on said end member for holding the same against said retainer, said end member having a concentric bore therethrough and a plunger shaft reciprocally mounted therein, said end member having sealing means engaging the bore of said cylinder and said plunger shaft, said cylinder and said end member having a fluid passage extending from the outside of said cylinder to the inner end of said cylinder to the inner end of said member internally of said cylinder relative to said sealing means engaging said shaft.

5. A cylinder having a bore therein, an end member removably positioned in said bore, said cylinder having an internal groove therein adjacent the outer end of said end member, a resilient ring in said groove forming an abutment for said end member, said end member provided with a screw threaded portion, and a screw threaded member, screw threadably engaging said screw threaded portion of said end member and directly contacting the end of said cylinder, whereby said end member is held in secure abutment with said ring.

6. An actuator cylinder construction comprising a tubular cylinder having a plunger bore therein, an end member in said bore, said cylinder provided with an internal groove therein adjacent said end member, a retainer in said groove providing an abutment for said end member, a nut directly engaging the end of said cylinder and screw threaded on said end member for holding the same against said retainer, said nut having an external dimension which substantially coincides with that of said cylinder, said cylinder and said end member having a fluid passage extending from the outside of said cylinder to the inner end of said end member, said passage extending into said end member being internally screw threaded to receive a conduit connection.

7. An actuator cylinder construction comprising, a tubular cylinder having a plunger bore therein, an end member in said bore, said cylinder provided with an internal groove therein adjacent said end member, a retainer in said groove providing an abutment for said end member, said end member having a concentric bore therein, a plunger shaft extending therethrough, said end member having seal means engaging the bore of said cylinder and said shaft, said end member having an externally screw threaded portion surrounding said shaft, and an internally screw threaded member threadably engaged thereon and firmly abutted to the end of said cylinder for holding said end member abutted against said retainer.

8. An actuator cylinder construction comprising, a tubular cylinder having a plunger bore therein, an end member in said bore, said cylinder provided with an internal groove therein adjacent said end member, a retainer in said groove providing an abutment for said end member, said end member having a concentric bore therein, a plunger shaft extending therethrough, said end member having seal means engaging the bore of said cylinder and said shaft, said end member having an externally screw threaded portion surrounding said shaft, an internally screw threaded member threadably engaged thereon and firmly abutted to the end of said cylinder for holding said end member abutted against said retainer, an internally screw threaded fluid passage in said end member communicating with the interior of said cylinder and an opening in the side wall of said cylinder in line with said fluid passage and disposed outwardly thereof.

References Cited in the file of this patent

UNITED STATES PATENTS

| 2,299,695 | Greene | Oct. 20, 1942 |
| 2,426,108 | Loewe | Aug. 19, 1947 |
| 2,518,787 | Huhtala | Aug. 15, 1950 |
| 2,533,531 | Stephens | Dec. 12, 1950 |
| 2,636,637 | Powers | Apr. 28, 1953 |
| 2,673,130 | Becker | Mar. 23, 1954 |

FOREIGN PATENTS

| 562,073 | Great Britain | June 16, 1944 |